(12) United States Patent
Chen et al.

(10) Patent No.: US 10,802,611 B2
(45) Date of Patent: Oct. 13, 2020

(54) INPUT UNIT AND NOTEBOOK COMPUTER WITH THE SAME

(71) Applicant: PEGATRON CORPORATION, Taipei (TW)

(72) Inventors: Chin-Shan Chen, Taipei (TW); Jing-Rung Wang, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 16/183,521

(22) Filed: Nov. 7, 2018

(65) Prior Publication Data

US 2019/0163291 A1 May 30, 2019

(30) Foreign Application Priority Data

Nov. 30, 2017 (TW) .............................. 106141976 A

(51) Int. Cl.
*G06F 3/0354* (2013.01)
*G06F 1/16* (2006.01)

(52) U.S. Cl.
CPC .......... *G06F 3/03545* (2013.01); *G06F 1/169* (2013.01); *G06F 1/1616* (2013.01); *G06F 3/03549* (2013.01)

(58) Field of Classification Search
CPC ............. G06F 3/03545; G06F 3/03549; G06F 1/1616; G06F 1/169; G05G 9/047
See application file for complete search history.

(56) References Cited

U.S. PATENT DOCUMENTS

| | | | | |
|---|---|---|---|---|
| 5,726,684 A * | 3/1998 | Blankenship | ......... | G06F 1/1616 345/163 |
| 5,969,520 A | 10/1999 | Schottler | | |
| 6,205,021 B1 * | 3/2001 | Klein | ..................... | G05G 9/047 345/167 |
| 7,221,360 B2 * | 5/2007 | Defuans | ................ | G06F 1/1626 178/19.01 |
| 2004/0127268 A1 * | 7/2004 | Wong | .................... | G06F 1/1626 455/575.1 |
| 2004/0155862 A1 * | 8/2004 | Higginson | ............... | G05G 1/06 345/156 |
| 2016/0291706 A1 * | 10/2016 | Trutna | ................ | G06F 3/03545 |

FOREIGN PATENT DOCUMENTS

| | | |
|---|---|---|
| TW | M246718 | 10/2004 |
| TW | M266675 | 6/2005 |
| TW | M286417 | 1/2006 |
| TW | M30973 | 4/2007 |
| TW | M311946 | 5/2007 |

* cited by examiner

*Primary Examiner* — Grant Sitta

(74) *Attorney, Agent, or Firm* — Muncy, Geissler, Olds & Lowe, P.C.

(57) ABSTRACT

An input unit is configured to be assembled to a base of a notebook computer and has a universal-ball cursor controlling device and a pen device. The universal-ball cursor controlling device is disposed at the base and having a stand and a ball. The ball is rotatably disposed at the stand and has a conjoining portion protruding outside the stand. The pen device is detachably connected to the conjoining portion of the ball, and is capable of driving the ball to rotate relative to the stand. The pen device may be implemented as a joystick for controlling video games or be implemented as a control stick for fire control involved in military application. The pen device may be implemented as a stylus, a laser pointer, a recording pen, a writing pen, or any other device shaped as a stick as well.

13 Claims, 14 Drawing Sheets

INPUT UNIT AND NOTEBOOK COMPUTER WITH THE SAME

CROSS-REFERENCE TO RELATED APPLICATION

The present application claims priority to TW 106141976, filed Nov. 30, 2017, entitled "INPUT UNIT AND NOTEBOOK COMPUTER WITH THE SAME".

BACKGROUND

1. Technical Field

The disclosure relates to an input unit of a notebook computer, and more particularly to an input unit for moving a cursor and providing a selection function of the notebook computer.

2. Related Art

Touchpads or mouse devices are input units applied to control cursors of conventional notebook computers. However, the touchpads and the mouse devices are inconvenient in terms of ease in manipulation and portability, respectively.

With respect to a touchpad mounted to a notebook computer, the touchpad has two shortcomings. First, the moving range of fingers is restricted by the area of the touchpad, therefore a cursor of the conventional notebook computer cannot achieve a long distance move at once. Secondly, the touchpad has multiple pressing areas for pressing or clicking operations, but these pressing areas are disposed at corners of the touchpad, ergonomically difficult for manipulating and controlling.

With respect to a mouse device connected to a notebook computer, first, the mouse device is inconvenient for carrying around with the notebook computer. Secondly, a wired mouse device has to occupy one of the universal serial bus sockets (USB sockets) of the conventional notebook computer. Thirdly, the wired mouse device is plugged into the USB socket for electrically connecting to the notebook computer via a wire, which restricts the moving range of the wired mouse device and may be pulled inadvertently, thereby damaging the USB socket. Fourthly, a wireless mouse device has to be powered by batteries and might fall to the ground accidentally and gets damaged. The wireless mouse device might be prone to loss as well.

To overcome the shortcomings of the conventional input devices of notebook computers, the present invention provides an input unit to mitigate or obviate the aforementioned problems.

SUMMARY

The main objective of the present invention is to provide an input unit for controlling a cursor of a notebook computer, the input unit being ergonomic and convenient for use.

The embodiment of the input unit is configured to be assembled to a base of a notebook computer and comprises a universal-ball cursor controlling device and a pen device. The universal-ball cursor controlling device is disposed at the base and has a stand and a ball. The ball is rotatably disposed at the stand and has a conjoining portion protruding outside the stand. The pen device is detachably connected to the conjoining portion of the ball, and is capable of driving the ball to rotate relative to the stand when the pen device is connected to the conjoining portion.

In order to achieve the above main objective, the embodiment of the present invention further provides a notebook computer, which comprises a base, an upper cover pivotally connected to the base, and an input unit disposed at the base.

When the pen device is erected, a thumb may push the pen device to drive the universal-ball cursor controlling device to control the cursor displayed on the screen display. The forefinger, the middle finger, the ring finger, and the little finger respectively manipulate the first button, the scroll wheel, the second button, and the third button of the control module to operate the notebook computer. The pen device may be implemented as a joystick for controlling video games or be implemented as a control stick for fire control involved in military application. The pen device may be implemented as a stylus, a laser pointer, a recording pen, a writing pen, or any other device shaped as a stick as well. The pen device is detachable from the universal-ball cursor controlling device for independent use.

Other objects, advantages, and novel features of the invention will become more apparent from the following detailed description when taken in conjunction with the accompanying drawings.

DETAILED DESCRIPTION OF THE EMBODIMENTS

Figure 1:
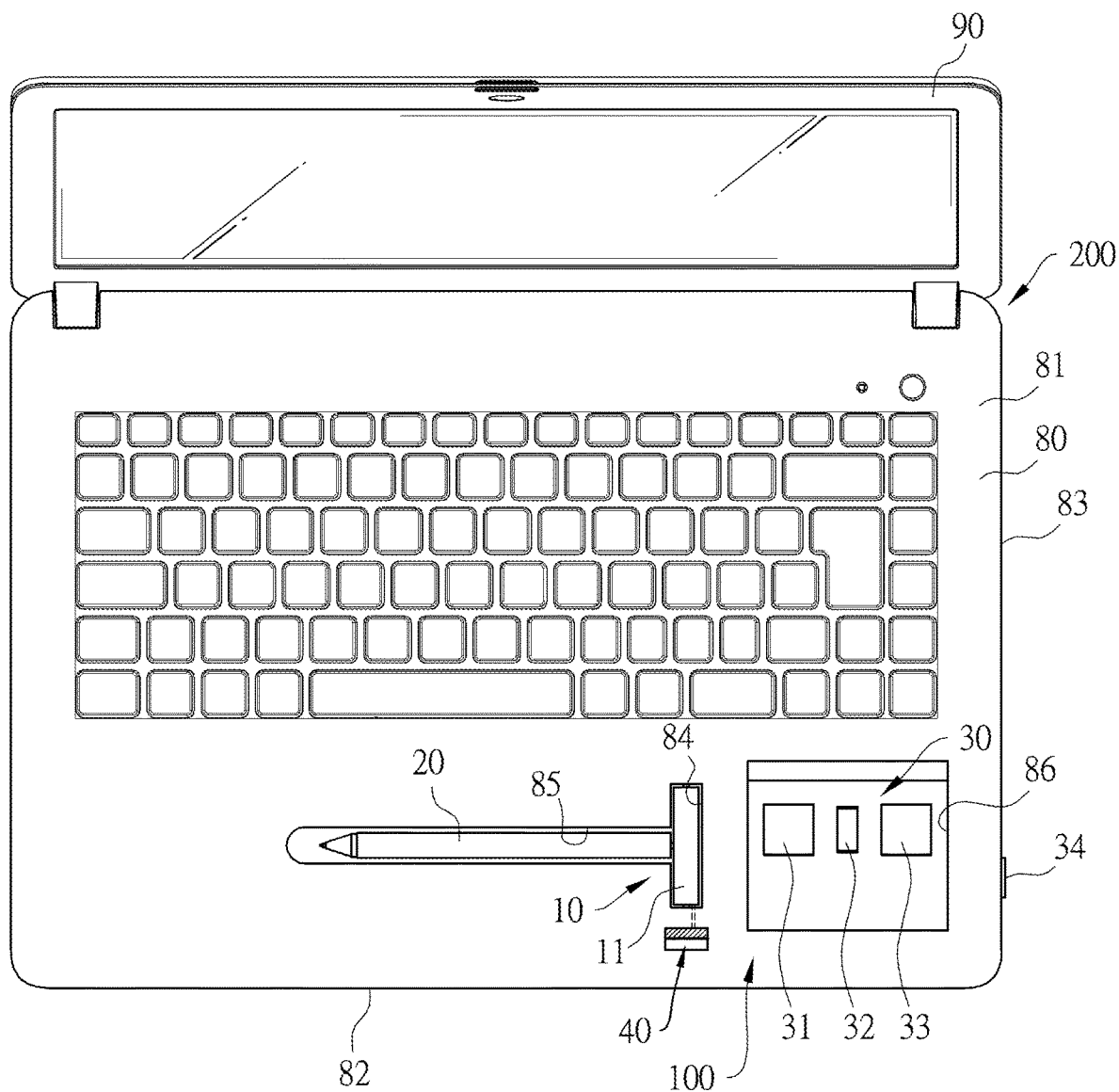
FIG. 1 is a top view of a notebook computer with an input unit in accordance with the present invention, wherein an angle fixing device with a pushing portion is expressed by profile lines.

With reference to FIG. 1, a notebook computer 200 equipped with an input unit in accordance with the present invention has a base 80, a screen display 90, and an input unit 100. The base 80 is rectangular and has two lateral edges, a front edge, a rear edge, a front lateral side, a top face 81, a front lateral side face 82, a stand trough 84, and a pen trough 85. The two lateral edges are parallel to each other and are defined as a right edge and a left edge, respectively. The right edge of the base 80 is disposed at the right side in FIG. 1. The left edge of the base 80 is disposed at the left side in FIG. 1. The front edge and the rear edge are parallel to each other. The screen display 90 is disposed at the rear edge of the base 80.

Figure 9:
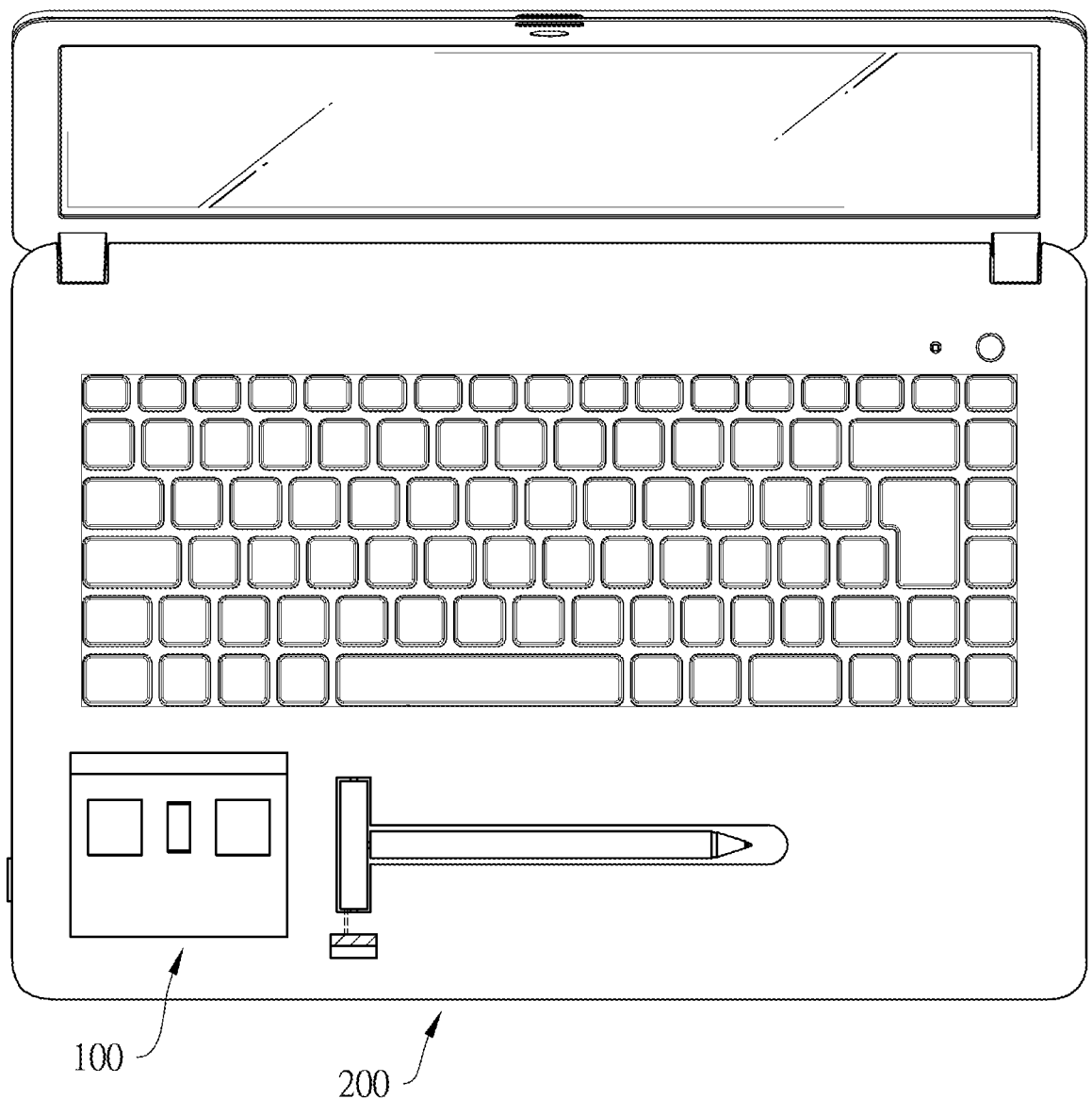
FIG. 9 is a top view of the notebook computer in FIG. 1, showing the input unit is disposed at the left side in FIG. 9, wherein an angle fixing device with a pushing portion is expressed by profile lines.
Figure 10:
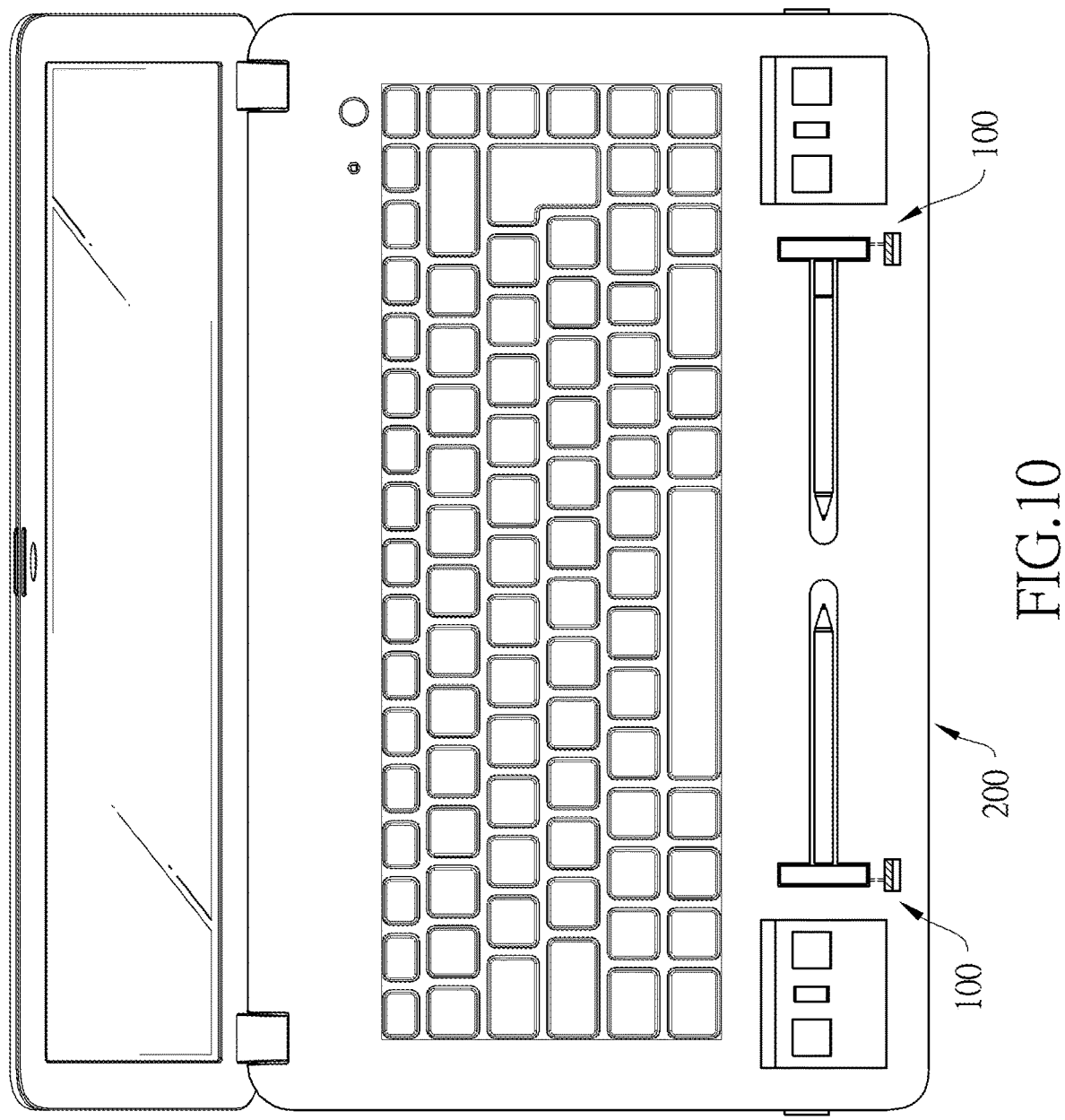
FIG. 10 is a top view of the notebook computer in FIG. 1, showing the notebook computer further has another input unit in accordance with the present invention, wherein an angle fixing device with a pushing portion is expressed by profile lines.

With reference to FIG. 1, the input unit 100 is disposed adjacent to the right edge of the base 80 for a right-handed user. With reference to FIG. 9, the input unit 100 is disposed adjacent to the left edge of the base 80 for a left-handed user. With reference to FIG. 10, the notebook computer 200 alternatively has an additional said input unit 100. The two input units 100 are respectively disposed adjacent to the right edge and the left edge of the base 80.

With reference to FIG. 1, the input unit 100 has a universal-ball cursor controlling device 10, a pen device 20, a control module 30, an angle fixing device 40, and a clamping device.

Figure 11:
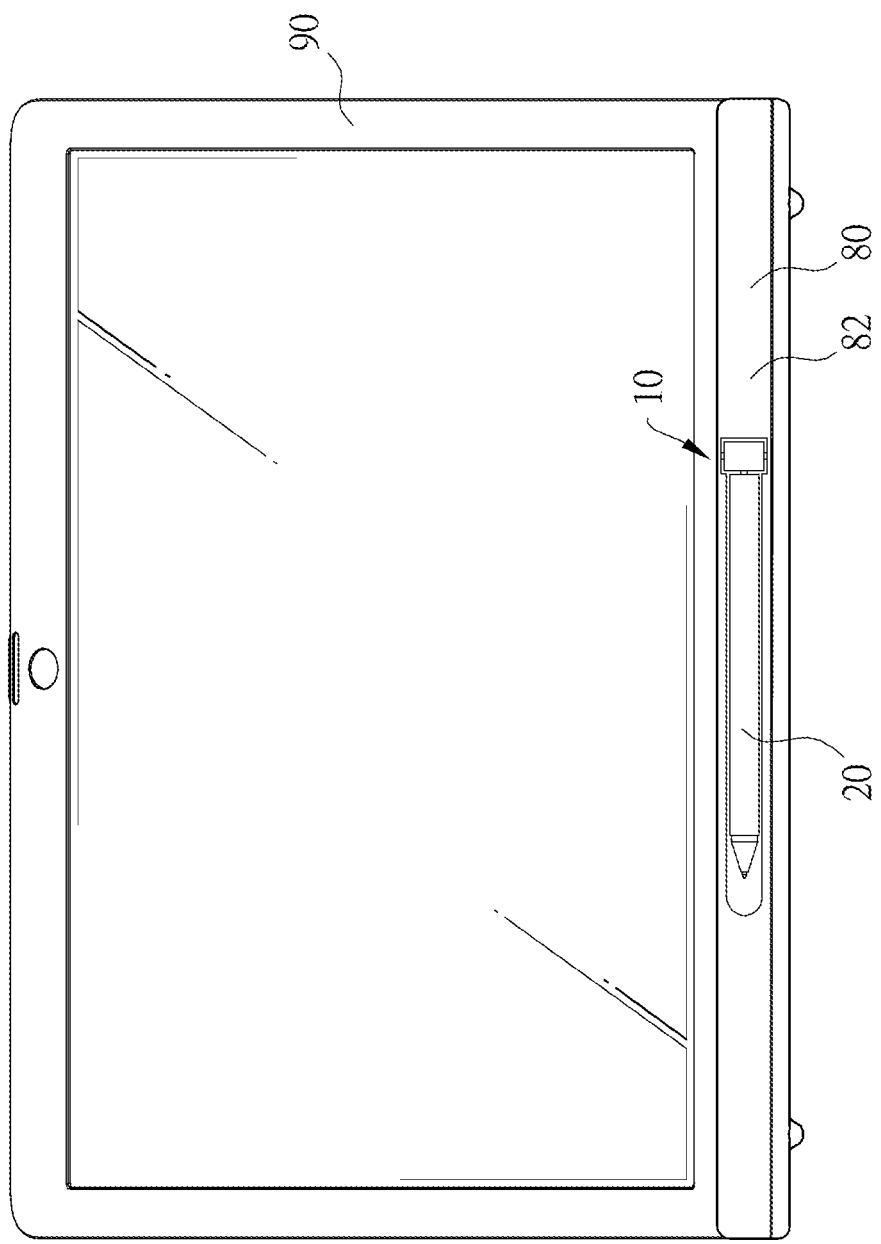
FIG. 11 is a side view of the notebook computer in FIG. 1, showing the input unit is disposed at a front side face of the base.
Figure 12:
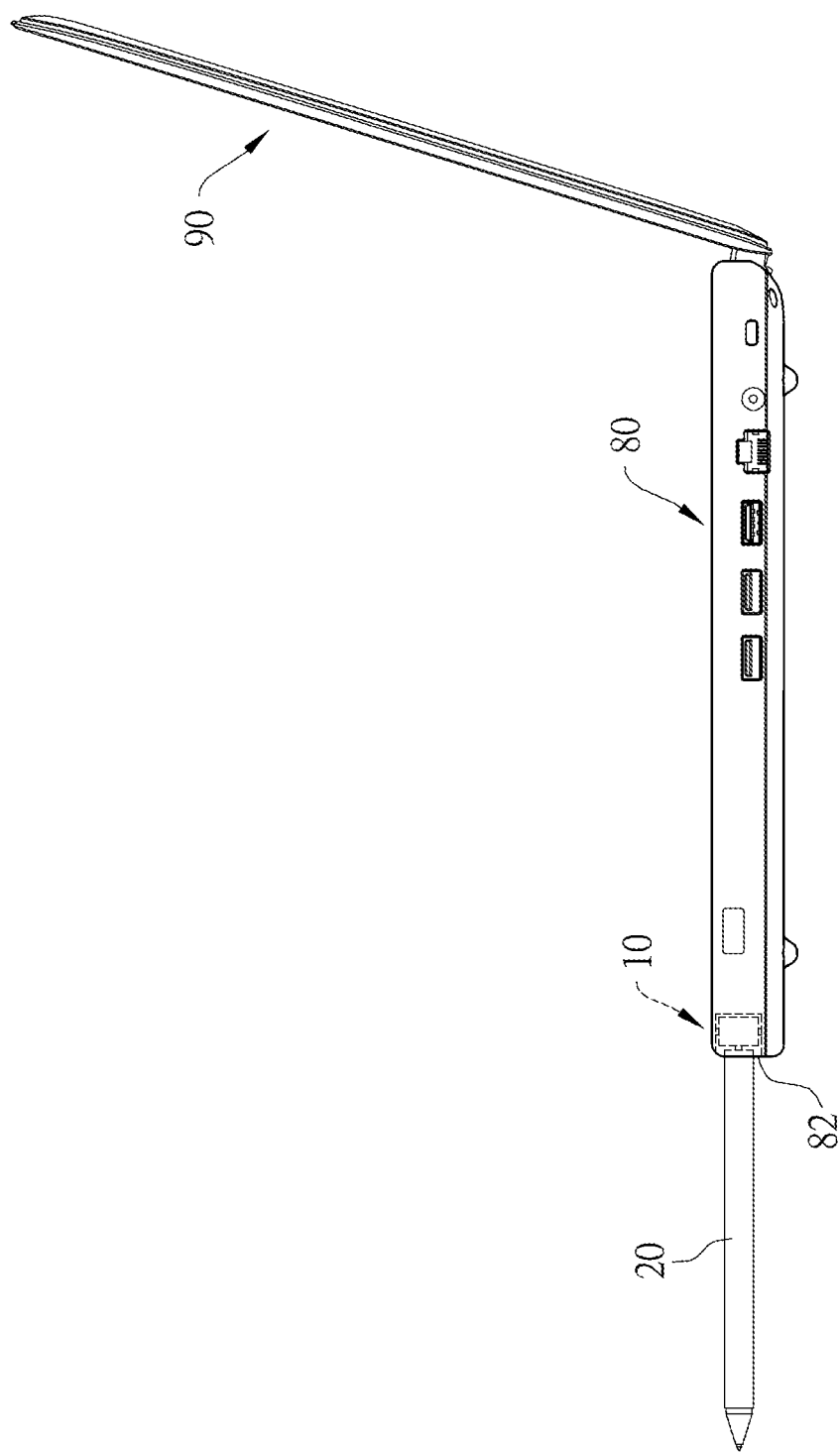
FIG. 12 is another side view of the notebook computer in FIG. 1, showing the input unit is disposed at the front side face of the base.

The universal-ball cursor controlling device 10 is disposed at the base 80 and is disposed adjacent to the right edge of the base 80. With reference to FIG. 1, the universal-ball cursor controlling device 10 is disposed at the top face 81 of the base 80. With reference to FIGS. 11 and 12, the universal-ball cursor controlling device 10 is disposed at the front lateral side face 82 of the base 80. The position of the universal-ball cursor controlling device 10 is not limited.

Figure 6:
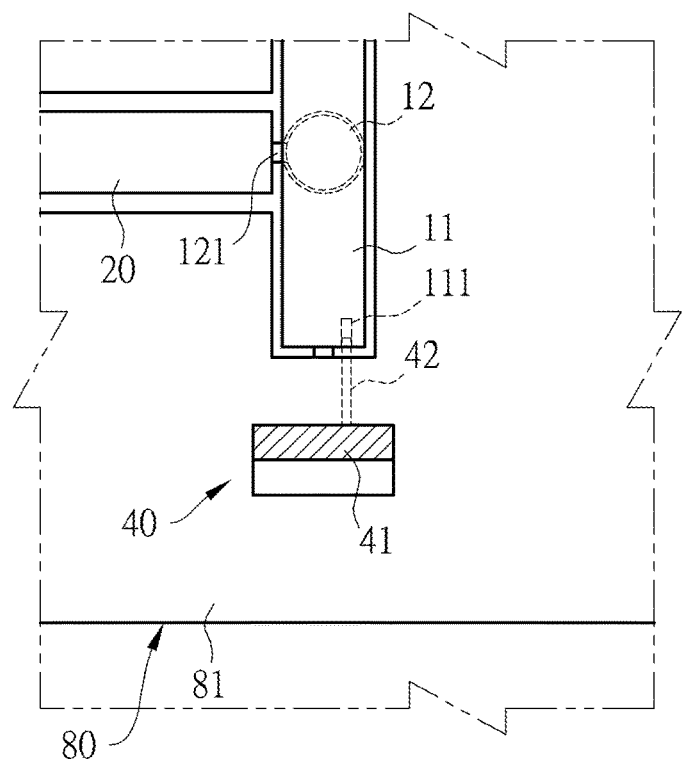
FIG. 6 is an enlarged top view of the base of the notebook computer in FIG. 1, showing an angle fixing device is disengaged from a stand, wherein an angle fixing device with a pushing portion is expressed by profile lines.
Figure 13:
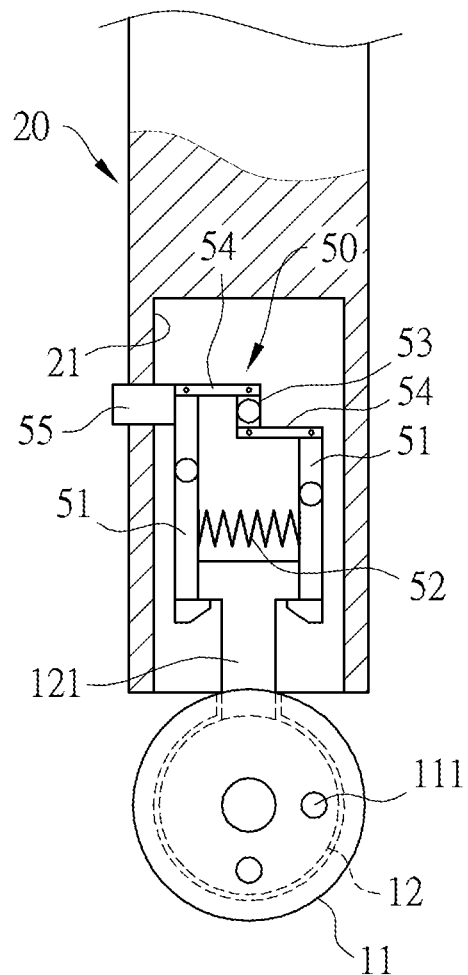
FIG. 13 is an enlarged schematic side view of the notebook computer in FIG. 1, showing a clamping device of a first configuration.

With reference to FIGS. 1, 6, and 13, the universal-ball cursor controlling device 10 has a stand 11 and a ball 12 (as shown in FIGS. 6 and 13). The stand 11 has a terminal end and a plurality of notches 111. The terminal end of the stand 11 faces to the front lateral side face 82 of the base 80. The plurality of notches 111 are formed in the terminal end of the stand 11 at angular intervals. The ball 12 has a conjoining portion 121. The ball 12 is rotatably mounted within the stand 11. The conjoining portion 121 is formed on the ball 12, protrudes out of the stand 11 along the pen trough 85, and has a diameter and two opposite sides. The ball 12 is capable of rotating relative to the stand 11. Movements of the ball 12 are converted to signals for controlling a cursor of the screen display 90. The universal-ball cursor controlling device 10 may be implemented as a trackball but is not limited to the trackball.

Figure 4:
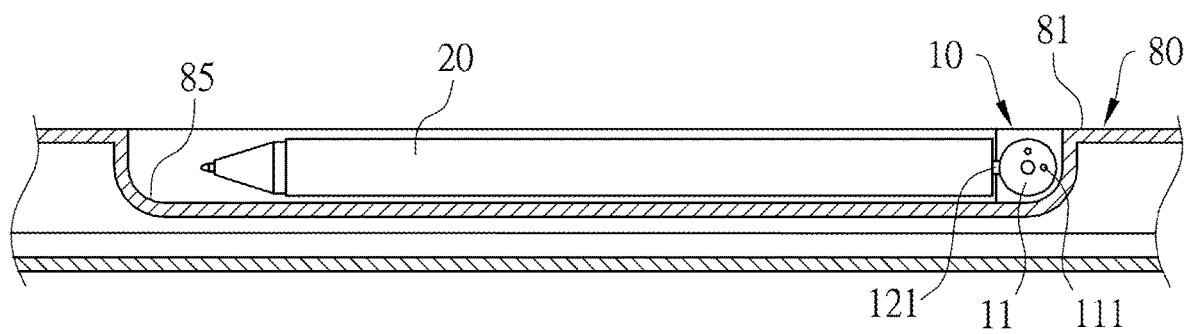
FIG. 4 is a partially enlarged cross-sectional side view of the base of the notebook computer in FIG. 1, showing a pen device is received in the base.
Figure 5:
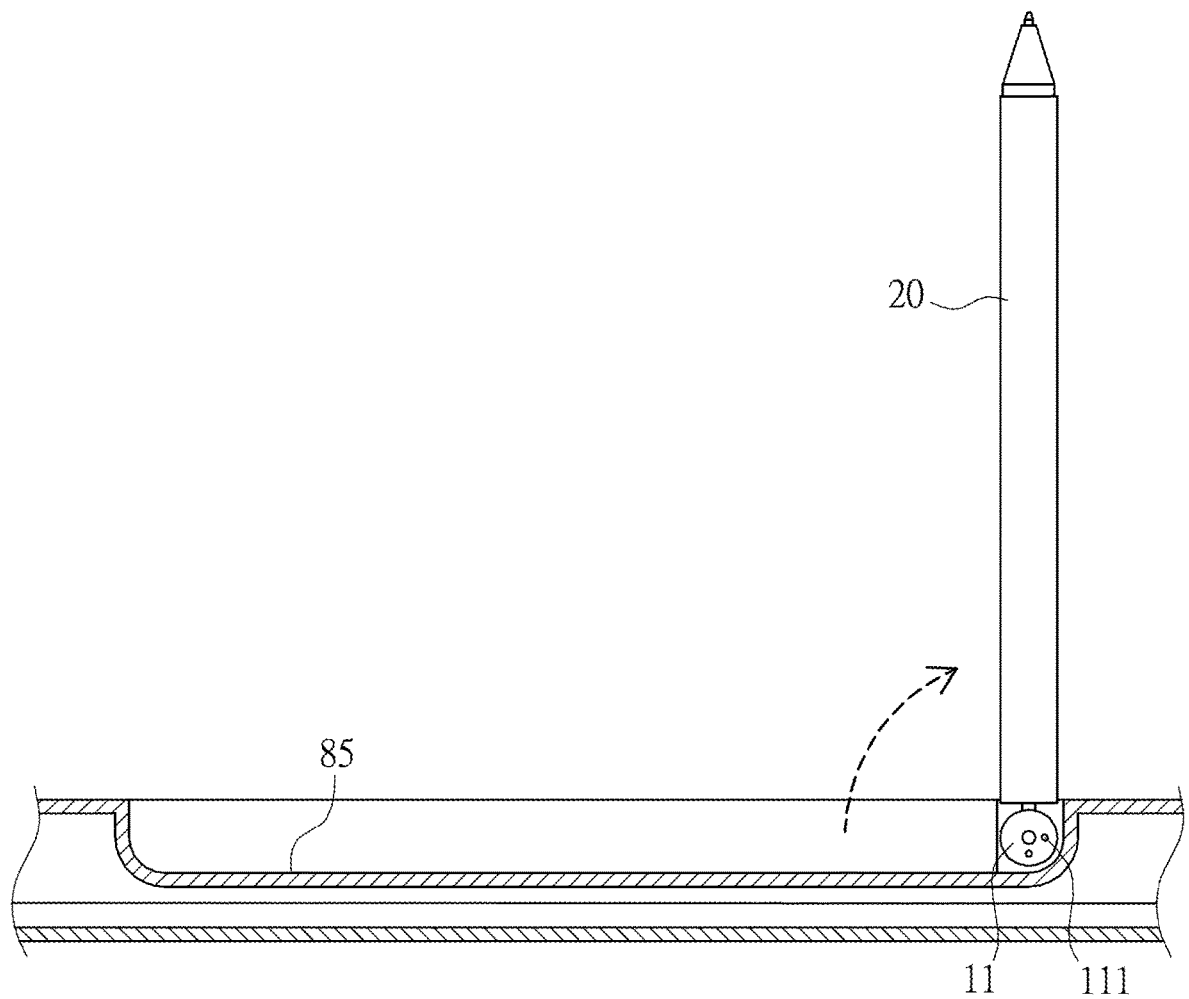
FIG. 5 is another partially enlarged cross-sectional side view of the base in FIG. 1, showing the pen device is erected.

With reference to FIGS. 1, 5, and 13, the pen device 20 has two opposite ends. One of the two opposite ends of the pen device 20 is detachably connected to the conjoining portion 121 of the ball 12 and is capable of driving the ball 12 to rotate relative to the stand 11. In other words, when the pen device 20 is connected to the conjoining portion 121 of the ball 12, the pen device 20 may be manually operated to drive the ball of the rotating unit 12 and to control the universal-ball cursor controlling device 10. With reference to FIGS. 4 and 5, the pen device 20 is a stylus pen. The pen device 20 is not limited to the stylus pen. The pen device 20 may be implemented as a laser pointer, a recording pen, a writing pen, or any other device shaped as a stick.

With reference to FIGS. 1, 4, and 6, in the present invention, the stand 11 of the universal-ball cursor controlling device 10 is rotatably mounted to the base 80. Specifically, the stand 11 is a pole. The stand trough 84 and the pen trough 85 of the base 80 formed in the base 80 communicate with each other. The stand trough 84 and the pen trough 85 of the base 80 are located in the top face 81 of the base 80 when the universal-ball cursor controlling device 10 is disposed at the top face 81 of the base 80. The stand trough 84 and the pen trough 85 of the base 80 are located in the front lateral side face 82 of the base 80 when the universal-ball cursor controlling device 10 is disposed at the front lateral side face 82 of the base 80.

The stand trough 84 and the pen trough 85 are elongated troughs that are perpendicularly connected with each other. With reference to FIGS. 1, 9, 10, and 11, in the present invention, the pen trough 85 laterally extends toward the left edge and the right edge of the base 80. The extending direction of the pen trough 85 is not limited. The pen trough 85 may extend toward the front edge and the rear edge of the base 80 or may obliquely extend relative to the front edge of the base 80.

The stand 11 is rotatably disposed in the stand trough 84. The pen device 20 is optionally disposed in the pen trough 85. When the pen device 20 is connected to the conjoining portion 121 of the ball 12 and is erect in position, the pen device 20 may be pushed and turned into the pen trough 85. The rotating unit 12 drives the stand 11 to rotate relative to the stand trough 84. With reference to FIGS. 1 and 4, more specifically, the stand 11 has a receiving recess with an opening. The opening of the receiving recess has a diameter larger than that of the conjoining portion 121 of the ball 12. The ball 12 is rotatably received in the receiving recess. The conjoining portion 121 protrudes out from the opening of the receiving recess. The diameter of the opening of the receiving recess of the stand 11 is larger than that of the conjoining portion 121. Therefore, the conjoining portion 121 is capable of rotating in the opening of the receiving recess and driving the ball 12 to rotate relative the receiving recess and the stand 11. Since the pen device 20 is connected to the conjoining portion 121, when the pen device 20 turns, the conjoining portion 121 is driven by the pen device 20 and abuts against an edge of the opening of the recess. The conjoining portion 121 drives the stand 11 to rotate relative to the stand trough 84. Therefore, the pen device 20 is capable of turning into the pen trough 85 without detaching from the conjoining portion 121 of ball 12.

Figure 7:
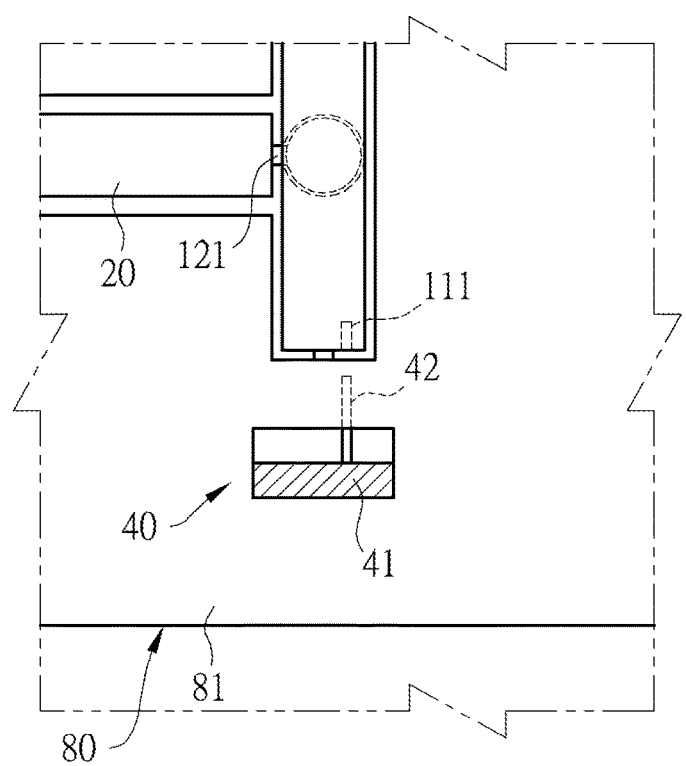
FIG. 7 is another enlarged top view of the base of the notebook computer in FIG. 1, showing the angle fixing device engages with the stand, wherein an angle fixing device with a pushing portion is expressed by profile lines.

With reference to FIGS. 4 to 7, in the present invention, the angle fixing device 40 is movably mounted to the base 80 and has a pushing portion 41 and an inserting portion 42. The pushing portion 41 is partially disposed outside the base 80. The inserting portion 42 is disposed within the base 80 and is connected to the pushing portion 41. When the universal-ball cursor controlling device 10 is disposed at the front lateral side face 82 of the base 80, the pushing portion 41 of the angle fixing device 40 is partially disposed outside the front lateral side face 82 of the base 80. With reference to FIGS. 6 and 7, the universal-ball cursor controlling device 10 is disposed at the top face 81 of the base 80, and the pushing portion 41 of the angle fixing device 40 is partially disposed outside the top face 81 of the base 80. The surface of the pushing portion 41 disposed is not limited.

The angle fixing device 40 is capable of moving toward and away from the stand 11 of the universal-ball cursor controlling device 10, selectively. When the pushing portion 41 of the angle fixing device 40 is pushed toward the stand 11, the inserting portion 42 is inserted in one of the plurality of notches 111 to prevent the stand 11 from rotating relative to the stand trough 84. The pushing portion 41 is manipulated to control whether the inserting portion 42 engages with the stand 11 and whether the stand 11 is rotatable. The angle fixing device 40 may further have a compression spring to press the pushing portion 41 and to keep the inserting portion 42 engaging with the stand 11.

Moreover, the stand 11 may have a cross-shaped recess to replace the plurality of notches 111. The inserting portion 42 may be implemented as a flat blade. The cross-shaped recess is coaxially formed at the terminal end of the stand 11. When the inserting portion 42 is implemented as a flat blade and engages with the cross-shaped recess, the stand 11 is unable to rotate relative to the stand trough 84 as well.

Figure 14:
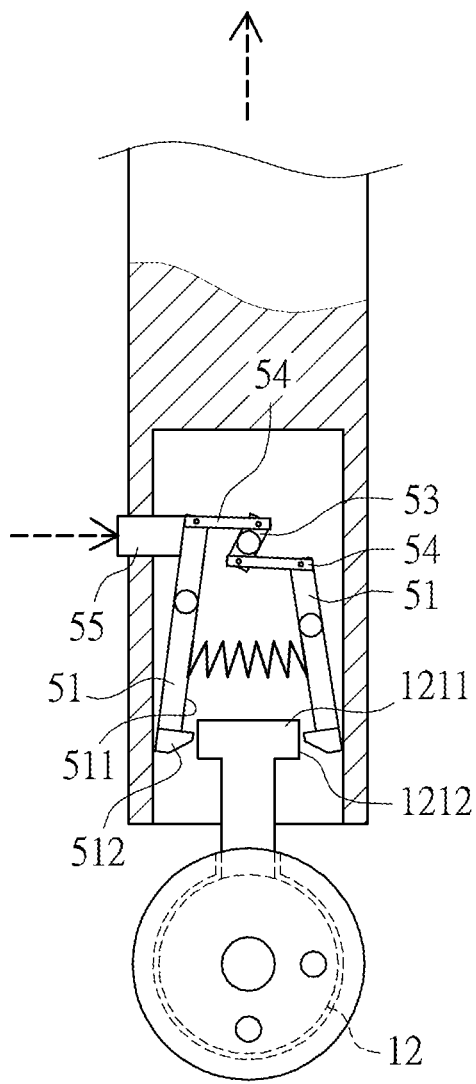
FIG. 14 is another enlarged schematic side view of the notebook computer in FIG. 1, showing the clamping device of the first configuration in operation.

With reference to FIGS. 13 and 14, the pen device 20 has a receiving recess 21 for receiving the clamping device. The receiving recess 21 has an inner surface. A clamping device 50 of a first configuration is mounted in the receiving recess 21 of the pen device 20 for connecting the rotating unit 12. The clamping device 50 of the first configuration has two clamping units 51, an elastic unit 52, a pivoting unit 53, two linkage units 54, and a push button 55. The elastic unit 52 is an extension spring, is connected to the two clamping units 51 and drives the two clamping units 51 to clamp the conjoining portion 121 of the ball 12 and keeps the pen device 20 firmly connected to the ball 12.

More specifically, each of the two clamping units 51 has a clamping face 511, an end, and a hook 512 disposed at the end of the clamping unit 51. The two clamping faces 511 of the two clamping units 51 face to each other. The conjoining portion 121 of the ball 12 has a side being distal from the ball 12 and two clamped portion 1211 formed at two opposite ends of the side of the conjoining portion 121. The two opposite sides of the conjoining portion 121 of the ball 12 respectively have an abutting face 1212. Each one of the two clamped portion 1211 has a bottom face. The two abutting faces 1212 of the conjoining portion 121 face to opposite directions. The two bottom faces of the two clamped portions 1211 are hooked by the two hooks 512 of the two clamping units 51 to achieve a firmly connection. The two clamping faces 511 respectively abut against the two abutting faces 1212 of the conjoining portion 121 to prevent the pen device 20 from rotating relative to the conjoining portion 121 of the ball 12. Therefore, movements of the pen device 20 can be accurately transmitted to the ball 12.

The pivoting unit 53 is pivotally connected to the inner surface of the receiving recess 21. The two linkage units 54 are pivotally connected to the pivoting unit 53 and pivotally and respectively connected to the two clamping units 51. Each one of the two linkage units 54 has two opposite ends. One of the two opposite ends of each one of the two linkage units 54 is pivotally connected to the pivoting unit 53. The other one of the two opposite ends of each one of the two linkage units 54 is pivoting connected to a corresponding one of the two pivoting units 53. With reference to FIG. 13, the two linkage units 54 are disposed horizontally, and the two clamping units 51 are perpendicular to the two linkage units 54 respectively. Also the first type clamping device 50 is stepped in shape. The push button 55 protrudes out from the receiving recess 21 of the pen device 20 and is connected to one of the two clamping units 51 and one of the two linkage units 54 that is connected to said clamping unit 51. The push button 55 may also be connected to one of the two clamping units 51 or one of the two linkage units 54. With reference of FIG. 13, the push button 55 is connected to a position where said one clamping units 51 and said one linkage units 54 are connected.

When pressed, the push button 55 pushes said one clamping unit 51 and said one linkage unit 54, and drives the pivoting unit 53 to rotate. The rotating pivoting unit 53 drives the other one of the two linkage units 54 and the other one of the two clamping units 51. The two clamping units 51 pivotally rotate and open to release the two clamped portions 1211 of the conjoining portion 121 of the ball 12, making the pen device 20 detachable from the ball 12.

Figure 15:
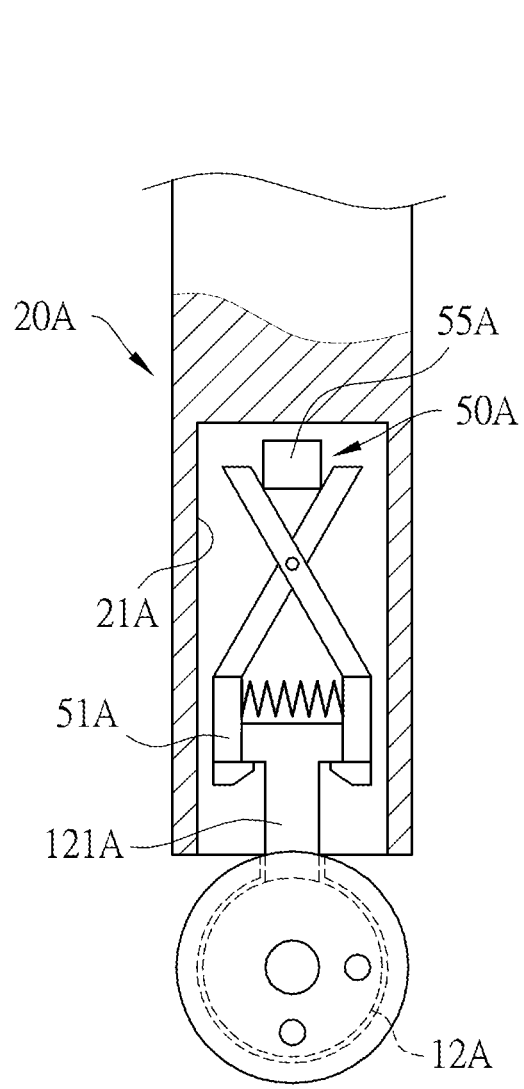
FIG. 15 is an enlarged schematic side view of the notebook computer in FIG. 1, showing a clamping device of a second configuration.
Figure 16:
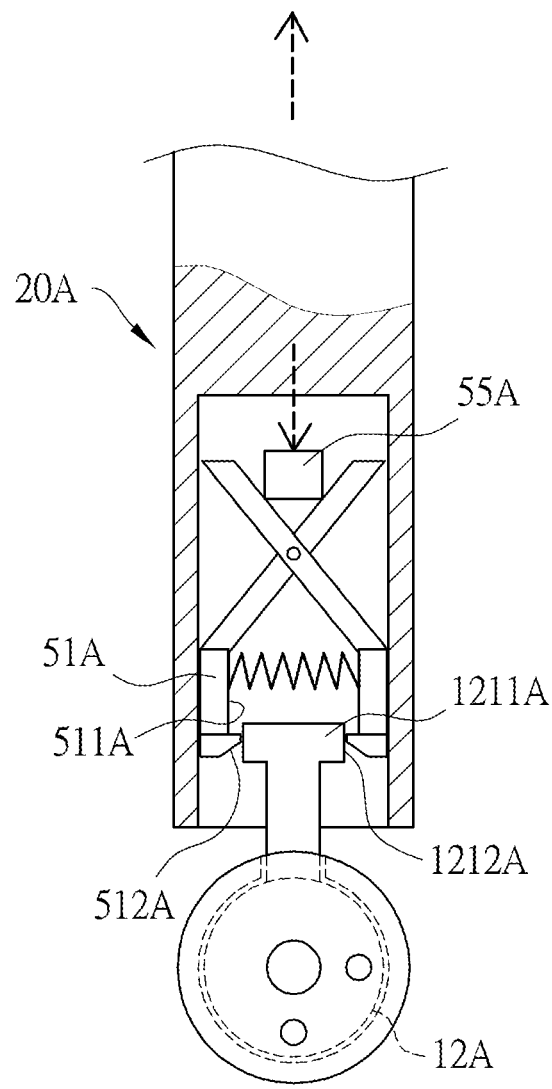
FIG. 16 is another enlarged schematic side view of the notebook computer in FIG. 1, showing the clamping device of the second configuration in operation.

With reference to FIGS. 15 and 16, the ball 12A is also mounted in the stand 11 and also has the conjoining portion 121A. The conjoining portion 121A also has the two clamped portions 1211A, and each one of the two clamped portions 1211A has the abutting faces 1212A as well. A clamping device 50A of a second configuration omits the pivoting unit 53 and the two linkage units 54 and has an abutting button 55A. The two clamping units 51A of the clamping device 50A of the second configuration are intersected with each other and pivotally connected to the inner surface of the receiving recess 21 of the pen device 20 together. Each one of the two clamping units 51A has the clamping face 511A and the hook 512A as well.

The abutting button 55A protrudes out from the receiving recess 21 of the pen device 20 and is slidable along the pen device 20. When the abutting button 55A moves relative to the pen device 20 and slides along the pen device 20 and towards the two clamping units 51A, the two clamping units 51A are abutted by the abutting button 55A. The two clamping units 51A pivotally rotate simultaneously and open to release the two clamped portions 1211A of the conjoining portion 121A of the ball 12, making the pen device 20 detachable from the ball 12.

Figure 17:
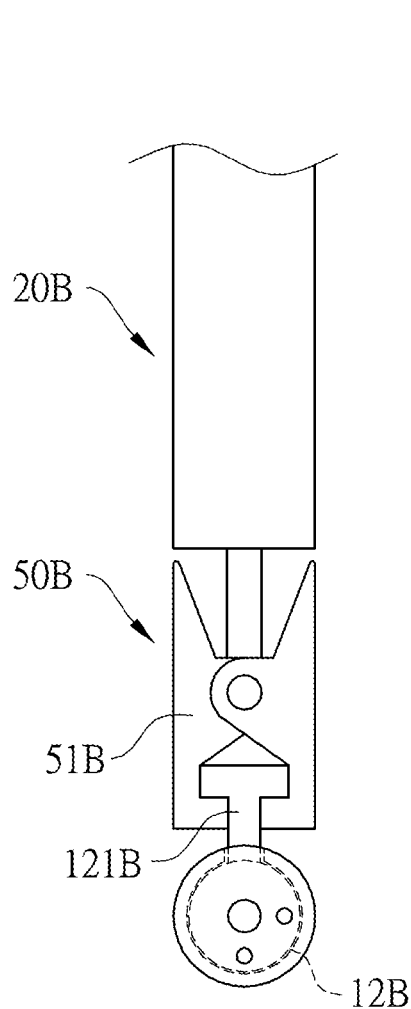
FIG. 17 is an enlarged schematic side view of the notebook computer in FIG. 1, showing a clamping device of a third configuration.
Figure 18:
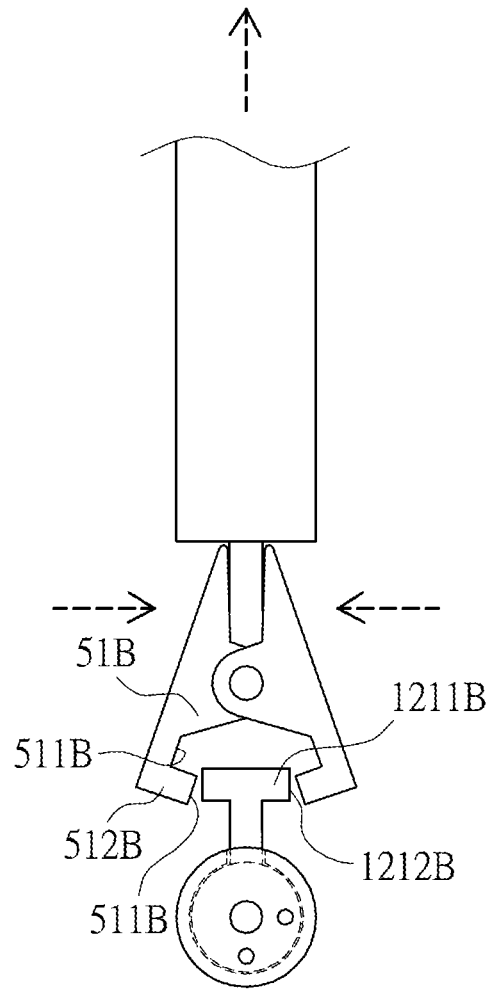
FIG. 18 is another enlarged schematic side view of the notebook computer in FIG. 1, showing the clamping device of the third configuration in operation.

With reference to FIGS. 17 and 18, the ball 12B is also mounted in the stand 11 and also has the conjoining portion 121B. The conjoining portion 121B also has the two clamped portions 1211B, and each one of the clamped portions 1211B has the abutting faces 1212B as well. A clamping device 50B of a third configuration is mounted to the pen device 20B, omits the push button 55 and the abutting button 55A, and has the two clamping units 51B. The two clamping units 51B are pivotally connected to each other, are pivotally connected to the pen device 20B, and are disposed outside the pen device 20B. The elastic unit of the clamping device 50B of the third configuration is a torsion spring connected to both the two clamping units 51B, and keeps the two clamping units 51B clamping the two clamped portions 1211B of the conjoining portion 121B. When the two clamping units 51B are pressed, the two clamping units 51B pivotally rotate simultaneously and open to release the clamped portion 1211B of the conjoining portion 121B of the ball 12B, making the pen device 20B detachable from the ball 12B.

Except with the clamping devices 50, 50A, 50B of the above-mentioned configurations, the pen device 20 may even be connected to the conjoining portion 121 of the ball 12 by magnetic force.

With reference to FIG. 1, the control module 30 is disposed at the top face 81 of the base 80 and between the universal-ball cursor controlling device 10 and one of the two lateral edges of the base 80. With reference to FIG. 1, the control module 30 is disposed between the universal-ball cursor controlling device 10 and the right edge of the base 80 for a right-handed user.

Figure 8:
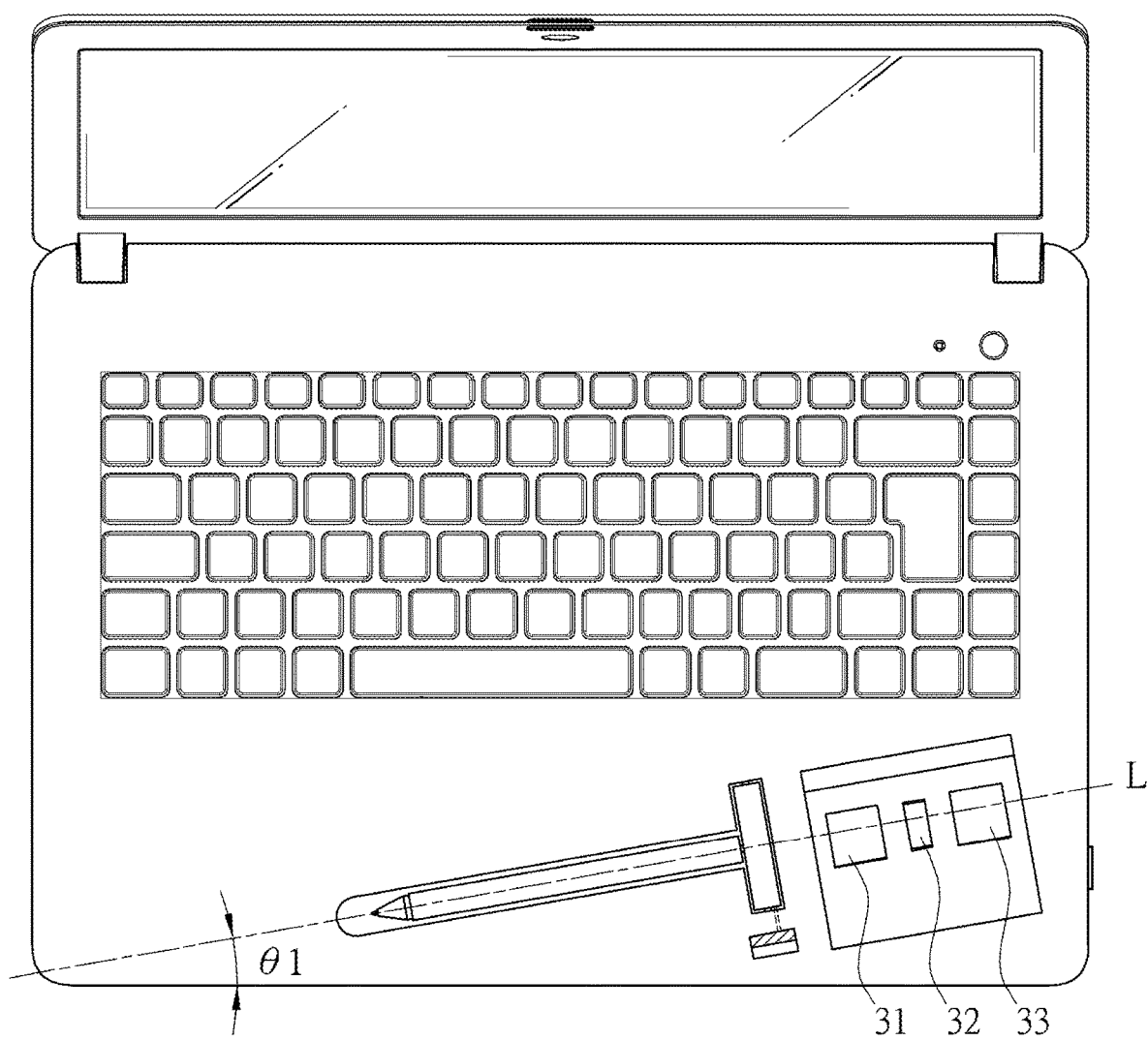
FIG. 8 is a top view of the notebook computer in FIG. 1, showing a control module is disposed obliquely, wherein an angle fixing device with a pushing portion is expressed by profile lines.

With reference to FIGS. 1 and 4, the control module 30 has a first button 31, a scroll wheel 32, a second button 33, and a third button 34 respectively designed for the forefinger, middle finger, ring finger, and little finger to operate. The first button 31, the scroll wheel 32, and the second button 33 are disposed at the top face 81 of the base 80. The scroll wheel 32 is disposed between the first button 31 and the second button 33. The first button 31, the scroll wheel 32, and the third button 34 are disposed along a line L. With reference to FIGS. 1, 9, and 10, said line L is parallel to the front edge and the rear edge of the base 80. With reference to FIG. 8, said line L extends obliquely, and an angle $\theta_1$ is defined between said line L and the front edge of the base 80. The angle $\theta_1$ is greater than or equal to 10 degrees and is less than or equal to 20 degrees ($10 \leq \theta_1 \leq 20$). As shown in FIG. 8, the angle $\theta_1$ is 15 degrees, being suitable for a palm and a wrist of a user and ergonomic in design.

Figure 3:
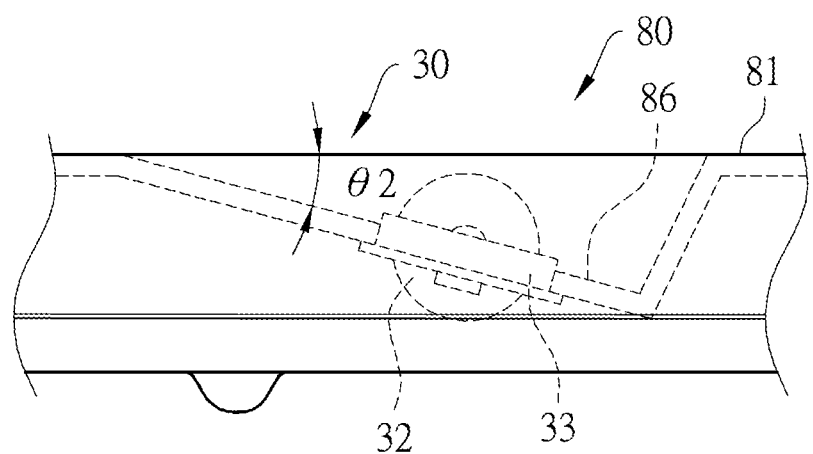
FIG. 3 is a partially enlarged side view of the notebook computer with the input unit in FIG. 1, showing an inclined recess is formed within a base of the notebook computer.

With reference to FIGS. 1 and 3, an inclined recess 86 is formed in the top face 81 of the base 80. The inclined recess 86 inclines toward the screen display 90 of the notebook computer 200 and downward and has a first oblique bottom face and a second oblique bottom face. The first oblique bottom face inclines toward the rear edge of the base 80. The second oblique bottom face inclines toward the front edge of the base 80. An angle $\theta_2$ is defined between the top face 81 of the base 80 and the first oblique bottom face of the inclined recess 86. The angle $\theta_2$ is greater than or equal to 10 degrees and is less than or equal to 20 degrees ($10 \leq \theta_1 \leq 20$). As shown in FIG. 3, the angle $\theta_2$ is 15 degrees and the first button 31, the scroll wheel 32, and the second button 33 of the control module 30 are disposed at the first oblique bottom face of the inclined recess 86 or ergonomics and are convenient for operation.

Figure 2:
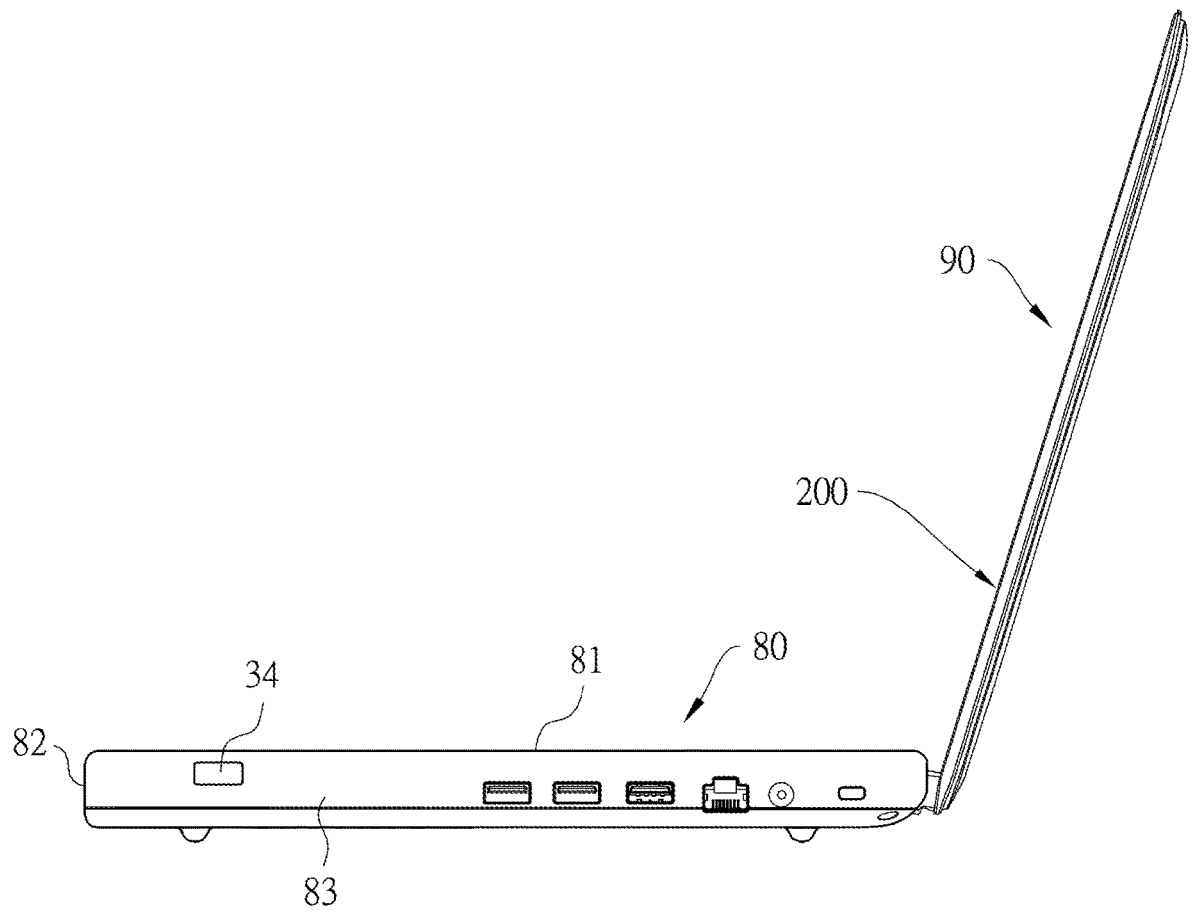
FIG. 2 is a side view of the notebook computer with the input unit in FIG. 1.

With reference to FIGS. 1 and 2, the third button 34 is disposed at a right lateral side face 83 of the base 80 for a right-handed user.

The first button 31 and the second button 33 may be set to coincide with a right button and a left button of a mouse device, respectively. The third button 34 may be set as a hot key for turning on or off functions of the first button 31, the scroll wheel 32, and the second button 33.

With reference to FIG. 10, the notebook computer 200 with two input units 100 is suitable for either a right-handed user or a left-handed user. For a right-handed user, the control module 30 of one of the two input units 100 disposed adjacent to the left edge may be customized as a keyboard shortcut. For a left-handed user, the control module 30 of the other one of the two input units 100 disposed adjacent to the right edge may be customized as a keyboard shortcut conversely.

The control module 30 may be implemented to have only one button or be implemented as any other cursor controlling device.

The input unit 100 is sized according to a size of a palm. When the pen device 20 is erected, a thumb may push the pen device 20 to drive the universal-ball cursor controlling device 10 to control the cursor displayed on the screen display 90. The forefinger, the middle finger, the ring finger, and the little finger respectively manipulate the first button 31, the scroll wheel 32, the second button 33, and the third button 34 to operate the notebook computer 200.

Additionally, the pen device 20 may be applied to play video games or for launch control in military facilities.

Finally, the pen device 20 may be implemented as a stylus, a laser pointer, a recording pen, a writing pen, or any other device shaped as a stick. The pen device 20 is detachable from the universal-ball cursor controlling device 10 for independent use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An input unit configured to be assembled to a base of a notebook computer, and the input unit comprising:
    a universal-ball cursor controlling device disposed at the base and having
        a stand; and
        a ball rotatably disposed at the stand and having a conjoining portion protruding outside the stand; and
    a pen device detachably connected to the conjoining portion of the ball, and being capable of driving the ball to rotate relative to the stand when the pen device is connected to the conjoining portion; the pen device having a clamping device having
        two clamping units; and
        an elastic unit connected to the two clamping units and driving the two clamping units to clamp the conjoining portion of the ball;
    wherein the base has
        a stand trough formed in the base; and
        a pen trough formed in the base and communicating with the stand trough;
    wherein the stand of the universal-ball cursor controlling device is rotatably disposed in the stand trough;
    wherein the pen device is selectively configured to be disposed in the pen trough, and is capable of driving the stand to rotate relative to the stand trough via the conjoining portion when the pen device is connected to the conjoining portion of the ball;
    wherein the input unit further comprises an angle fixing device mounted inside the base, and the angle fixing device comprises
        a pushing portion movably mounted inside the base and partially disposed outside the base; and
        an inserting portion connected to the pushing portion, movably mounted inside the base, and selectively configured to be inserted into the stand of the universal-ball cursor controlling device to prevent the stand from rotating relative to the stand trough.

2. The input unit as claimed in claim 1, wherein each of the two clamping units has a clamping face;

two opposite sides of the conjoining portion of the ball each have an abutting face respectively and the clamping faces of the clamping units respectively abut against the abutting faces of the conjoining portion.

3. The input unit as claimed in claim 1, wherein
an end of each one of the two clamping units has a hook;
the conjoining portion of the ball has two clamped portions respectively formed at two opposite ends of a side of the conjoining portion that is distal from the ball; and
the two clamped portions are hooked by the two hooks of the two clamping units.

4. An input unit configured to be assembled to a base of a notebook computer, and the input unit comprising:
   a universal-ball cursor controlling device disposed at the base and having
      a stand; and
      a ball rotatably disposed at the stand and having a conjoining portion protruding outside the stand; and
   a pen device detachably connected to the conjoining portion of the ball, and being capable of driving the ball to rotate relative to the stand when the pen device is connected to the conjoining portion; the pen device having a clamping device having
      two clamping units; and
      an elastic unit connected to the two clamping units and driving the two clamping units to clamp the conjoining portion of the ball;
   wherein the two clamping units are respectively and pivotally connected to the pen device;
   wherein the clamping device further has
      a pivoting unit pivotally connected to the pen device;
      two linkage units respectively having two opposite ends, one of the two opposite ends of each one of the two linkage units pivotally connected to the pivoting unit;
      the other two opposite ends of the two linkage units pivotally and respectively connected to the two clamping units; and
      a push button connected to one of the two linkage units or one of the two clamping units and protruding out from the pen device;
   wherein when pressed, the push button pushes said one of the two linkage units or said one of the two clamping units, and drives the pivoting unit to rotate; and
   wherein the rotating pivoting unit drives the other one of the two linkage units and the other one of the two clamping units to pivotally rotate.

5. An input unit configured to be assembled to a base of a notebook computer, and the input unit comprising:
   a universal-ball cursor controlling device disposed at the base and having
      a stand; and
      a ball rotatably disposed at the stand and having a conjoining portion protruding outside the stand; and
   a pen device detachably connected to the conjoining portion of the ball, and being capable of driving the ball to rotate relative to the stand when the pen device is connected to the conjoining portion; the pen device having a clamping device having
      two clamping units; and
      an elastic unit connected to the two clamping units and driving the two clamping units to clamp the conjoining portion of the ball;
   wherein the two clamping units are intersected and pivotally connected to the pen device together;
   wherein the clamping device has an abutting button;
   wherein the abutting button protrudes out from the pen device and is slidable along the pen device; and
   wherein when the abutting button moves relative to the pen device, the two clamping units are able to be abutted by the abutting button and pivotally rotate simultaneously.

6. The input unit as claimed in claim 1, wherein
the base of the notebook computer has a top face and two lateral edges;
the input unit further has a control module disposed at the top face of the base and disposed between the universal-ball cursor controlling device and one of the two lateral edges of the base.

7. An input unit configured to be assembled to a base of a notebook computer, and the input unit comprising:
   a universal-ball cursor controlling device disposed at the base and having
      a stand; and
      a ball rotatably disposed at the stand and having a conjoining portion protruding outside the stand; and
   a pen device detachably connected to the conjoining portion of the ball, and being capable of driving the ball to rotate relative to the stand when the pen device is connected to the conjoining portion; the pen device having a clamping device having
      two clamping units; and
      an elastic unit connected to the two clamping units and driving the two clamping units to clamp the conjoining portion of the ball;
   wherein the base of the notebook computer has a top face and two lateral edges;
   wherein the input unit further has a control module disposed at the top face of the base and disposed between the universal-ball cursor controlling device and one of the two lateral edges of the base;
   wherein the control module has
      a first button disposed at the top face of the base;
      a second button disposed at the top face of the base; and
      a scroll wheel disposed between the first button and the second button.

8. An input unit configured to be assembled to a base of a notebook computer, and the input unit comprising:
   a universal-ball cursor controlling device disposed at the base and having
      a stand; and
      a ball rotatably disposed at the stand and having a conjoining portion protruding outside the stand; and
   a pen device detachably connected to the conjoining portion of the ball, and being capable of driving the ball to rotate relative to the stand when the pen device is connected to the conjoining portion;
   wherein the base of the notebook computer has a top face and two lateral edges;
   wherein the input unit further has a control module disposed at the top face of the base and disposed between the universal-ball cursor controlling device and one of the two lateral edges of the base;
   wherein the control module has
      a first button disposed at the top face of the base;
      a second button disposed at the top face of the base; and
      a scroll wheel disposed between the first button and the second button;
   wherein the first button, the second button, and the scroll wheel are disposed along a line;
   wherein an angle is defined between the line and a front edge of the base; and wherein the angle is greater than or equal to 10 degrees and is less than or equal to 20 degrees.

9. An input unit configured to be assembled to a base of a notebook computer, and the input unit comprising:
a universal-ball cursor controlling device disposed at the base and having
a stand; and
a ball rotatably disposed at the stand and having a conjoining portion protruding outside the stand; and
a pen device detachably connected to the conjoining portion of the ball, and being capable of driving the ball to rotate relative to the stand when the pen device is connected to the conjoining portion; the pen device having a clamping device having
two clamping units; and
an elastic unit connected to the two clamping units and driving the two clamping units to clamp the conjoining portion of the ball;
wherein the base of the notebook computer has a top face and two lateral edges;
wherein the input unit further has a control module disposed at the top face of the base and disposed between the universal-ball cursor controlling device and one of the two lateral edges of the base;
wherein the control module has a third button disposed at a lateral side face of the base wherein the lateral side face is disposed corresponding to the one of the two lateral edges of the base.

10. An input unit configured to be assembled to a base of a notebook computer, and the input unit comprising:
a universal-ball cursor controlling device disposed at the base and having
a stand; and
a ball rotatably disposed at the stand and having a conjoining portion protruding outside the stand; and
a pen device detachably connected to the conjoining portion of the ball, and being capable of driving the ball to rotate relative to the stand when the pen device is connected to the conjoining portion;
wherein the base of the notebook computer has a top face and two lateral edges;
wherein the input unit further has a control module disposed at the top face of the base and disposed between the universal-ball cursor controlling device and one of the two lateral edges of the base;
wherein the base has an inclined recess formed in the top face of the base;
wherein the inclined recess inclines downward and toward a screen display of the notebook and an inclined angle of the inclined recess is greater than or equal to 10 degrees and is less than or equal to 20 degrees; and
wherein the control module is disposed in the inclined recess.

11. A notebook computer comprising:
a base;
an upper cover pivotally connected to the base; and
an input unit as claimed in claim 1 and disposed on the base.

12. A notebook computer comprising:
a base;
an upper cover pivotally connected to the base; and
an input unit as claimed in claim 8 and disposed on the base.

13. A notebook computer comprising:
a base;
an upper cover pivotally connected to the base; and
an input unit as claimed in claim 10 and disposed on the base.

* * * * *